(12) United States Patent
Liu

(10) Patent No.: US 10,610,040 B2
(45) Date of Patent: Apr. 7, 2020

(54) BREWING AND SQUEEZING CUP

(71) Applicant: Zhixing Liu, Guangzhou (CN)

(72) Inventor: Zhixing Liu, Guangzhou (CN)

( * ) Notice: Subject to any disclaimer, the term of this patent is extended or adjusted under 35 U.S.C. 154(b) by 614 days.

(21) Appl. No.: 15/315,167

(22) PCT Filed: Feb. 26, 2016

(86) PCT No.: PCT/CN2016/074679
§ 371 (c)(1),
(2) Date: Nov. 30, 2016

(87) PCT Pub. No.: WO2016/134672
PCT Pub. Date: Sep. 1, 2016

(65) Prior Publication Data
US 2017/0196393 A1 Jul. 13, 2017

(30) Foreign Application Priority Data

Feb. 27, 2015 (CN) .......................... 2015 1 0090235

(51) Int. Cl.
*A47J 19/02* (2006.01)
*B65D 43/02* (2006.01)
*B65D 51/24* (2006.01)
*G08B 21/24* (2006.01)
*A47G 19/22* (2006.01)
*A47J 31/18* (2006.01)

(52) U.S. Cl.
CPC .......... *A47J 19/02* (2013.01); *A47G 19/2205* (2013.01); *A47J 19/023* (2018.08); *A47J 31/18* (2013.01);
(Continued)

(58) Field of Classification Search
CPC ........ A47J 19/02; A47J 19/023; A47J 19/025; A47J 31/18; A47J 31/20; A47J 31/44;
(Continued)

(56) References Cited

FOREIGN PATENT DOCUMENTS

| CN | 2650649 | 10/2004 |
|---|---|---|
| CN | 203676817 | 7/2014 |

(Continued)

OTHER PUBLICATIONS

Chinese to English machine translation of CN104605720.*
(Continued)

*Primary Examiner* — Michael G Hoang
(74) *Attorney, Agent, or Firm* — Snell & Wilmer L.L.P.

(57) ABSTRACT

Disclosed is a brewing and squeezing cup, including a brewing and squeezing device (10), a bottom cover (20) and a cup body (30), wherein the brewing and squeezing device (10) comprises a cone (110) with an accommodating chamber and a cup cover (120) in a penetrating shape, a bottom end of the cone (110) is provided with a filter plate (130) extending towards an outer periphery thereof, the filter plate (130) is provided with a plurality of first filter holes (132), the bottom end of the cone (110) is provided with an opening (112) in communication with the accommodating chamber, an outer wall of the cone (110) is provided with a plurality of scraping strips (114) or a plurality of protrusions, the outer wall of the cone (110) is also provided with a plurality of second filter holes (116) penetrating to the accommodating cavity, the filter plate (130) is connected to the cup cover (120), the cup cover (120) is connected to the cup body (30) in a detachable manner, the cone (110) can be arranged with a tip facing upwards or downwards with respect to the cup body (30), and the bottom cover (20) covers the opening (112) of the cone (110), and the bottom cover (20) is connected to the cup cover (120) in a detachable manner. The brewing and squeezing cup can not only squeeze for fruit juice but can also brew tea by providing the brewing and squeezing device (10); it can also control the concentration of the tea with a simple structure, convenient to clean and carry.

12 Claims, 7 Drawing Sheets

(52) U.S. Cl.
CPC ..... *B65D 43/0225* (2013.01); *B65D 43/0231* (2013.01); *B65D 51/24* (2013.01); *G08B 21/24* (2013.01)

(58) Field of Classification Search
CPC ............ A47G 19/2205; B65D 43/0225; B65D 51/24; B65D 43/0231; G08B 21/24
USPC .................................. 99/279–280, 323, 483
See application file for complete search history.

(56) References Cited

FOREIGN PATENT DOCUMENTS

| | | |
|---|---|---|
| CN | 203709791 | 7/2014 |
| CN | 203789596 | 8/2014 |
| CN | 204033036 | 12/2014 |
| CN | 104352133 | 2/2015 |
| CN | 104605720 | 5/2015 |
| CN | 204445293 | 7/2015 |
| TW | M495171 | 2/2015 |

OTHER PUBLICATIONS

Chinese to English machine translation of CN 2650649.*
Chinese to English machine translation of CN 104352133.*
PCT; International Search Report dated Jun. 1, 2016 in Application No. PCT/CN2016/074679.

\* cited by examiner

BREWING AND SQUEEZING CUP

CROSS-REFERENCE TO RELATED APPLICATIONS

The present application is a U.S. National Stage entry under 35 U.S.C. § 371 of International Application No. PCT/CN2016/074679, filed Feb. 26, 2016, which claims priority to Chinese Application No. 201510090235.9, filed Feb. 27, 2015, which applications are hereby incorporated by reference in their entirety.

FIELD

The present disclosure relates to a cup, and in particular, relates to a brewing and squeezing cup.

BACKGROUND

With the development of people's daily life and the awareness of environmental protection, people pay more and more attention to body health care and reduction of disposable bottled drink usage for environmental protection. Fresh fruit juice and tea are common beverages in our daily life. Nutrient elements in fruit are very beneficial to human health, but senior people are seriously lack of fruit due to dental problems, and the electric juicer is troublesome to operate and clean. Meanwhile, children like to drink various fruit juice beverages, but their parents generally control the children's drinking of the fruit juice beverages due to fear of health problem caused by additives in the fruit juice beverages. In addition, it is difficult to quickly separate tea leaves from the boiled water during making the tea, which causes difficulty to control the concentration and best taste of tea. A traditional cup generally has a single function and cannot implement both functions of squeezing fruit juice and brewing tea. Another type of cup is proposed to be used in combination with attached squeezer and tea maker, but there may be too many accessories, with a requirement of a large amount of water for cleaning, and inconvenience to carry.

SUMMARY

Based on the above, in order to overcome the defects in the prior art, an objective of the present disclosure is to provide a brewing and squeezing cup, which can not only squeeze fruit juice but can also brew tea, and is simple in structure and easy to carry.

A technical solution of the present disclosure is described as below.

A brewing and squeezing cup is provided, including a brewing and squeezing device, a bottom cover and a cup body. The brewing and squeezing device includes a cone with an accommodating chamber and a cup cover in a penetrating shape, a bottom end of the cone is provided with a filter plate extending towards an outer periphery thereof, the filter plate is provided with a plurality of first filter holes, the bottom end of the cone is provided with an opening in communication with the accommodating chamber, an outer wall of the cone is provided with a plurality of scraping strips or a plurality of protrusions, the outer wall of the cone is further provided with a plurality of second filter holes penetrating to the accommodating chamber, the filter plate is connected to the cup cover, the cup cover is connected to the cup body in a detachable manner, the cone is further arranged with a tip facing upwards or downwards with respect to the cup body, the bottom cover is adapted to cover the opening of the cone, and the bottom cover is connected to the cup cover in a detachable manner.

Further technical solutions of the present disclosure are described as below.

The filter plate is connected to the cup cover in a detachable manner, so that when it needs to brew tea, the tip of the cone is arranged to face downwards with respect to the cup body, and the bottom cover is connected to the cup cover to cover the opening; and when it needs to squeeze fruit juice, the tip of the cone is arranged to face upwards with respect to the cup body, and the bottom cover is separated from the cup cover to expose the opening.

An outer periphery of the filter plate is provided with at least two first bosses, an outer periphery of the bottom cover is provided with at least two second bosses, an inner wall of the cup cover is provided with a slot fitting with the first bosses and the second bosses, and the filter plate and the bottom cover are adapted to be engaged with the inner wall of the cup cover through the fitting between the first bosses and the slot, and the fitting between the second bosses and the slot respectively.

The brewing and squeezing cup further includes a seal ring, an inner wall of the seal ring is provided with a first groove fitting with the outer periphery, an outer wall of the seal ring is provided with through holes penetrating to the inner wall of the seal ring, the through holes fit with the first bosses, the seal ring is adapted to be fit over the outer periphery of the filter plate through the first groove, and the first bosses are adapted to extend out of the seal ring through the through holes.

The inner wall of the cup cover is provided with a circular flange at a middle part of the inner wall of the cup cover, the slot is arranged at one side of the flange, the slot includes a guide groove arranged along a axial direction of the cup cover, and an inserting groove arranged on guide groove side, the inserting groove is in communication with the guide groove, and a communication channel between the inserting groove and the guide groove is provided with a fastening portion adapted to restrict the first bosses and the second bosses from slipping out of the inserting groove.

The bottom cover is provided with a projecting fastening seat on a side opposite to the opening, so that when the bottom cover covers the opening, an inner circle of the seal ring covers on an outer periphery of the fastening seat; one end face of the seal ring is provided with two projecting ribs, a gap between the two ribs forms a second groove; and when brewing tea, the second groove of the seal ring covers on a rim of the cup body, and when squeezing fruit juice, the seal ring is reversely mounted to make the ribs abut against the flange.

A surface of the fastening seat is provided with at least two limit stops, the opening of the cone is provided with at least two limit grooves fitting with the limit stops, and the limit stop is adapted to be inserted into the limiting groove when the bottom cover covers the opening.

The plurality of scraping strips are evenly arranged on the outer wall of the cone around a center line of the cone, each scraping strip extending from the tip of the cone to the bottom of the cone, with a width and a height gradually increased from the tip of the cone to the bottom of the cone.

The filter plate is fixedly connected to the cup cover, and the filter plate is fixed at the middle part of the inner wall of the cup cover, and each of portions of the inner wall of the sup cover at both sides of the filter plate is capable of being connected to an outer wall of the rim of the cup body by screw threads, so that for brewing tea, one side of the cup cover close to the tip of the cone is connected to the cup body to make the tip of the cone face downwards with respect to the cup body, and the bottom cover is connected to the cup cover to cover the opening, and for squeezing fruit juice, one side of the cup cover away from the tip of the cone is connected to the cup body to make the tip of the cone face upwards with respect to the cup body, and the bottom cover is separated from the cup cover to expose the opening.

The cup body includes an inner container and a housing covering the inner container, an outer wall of an opening of the housing is provided with a first external screw thread, an inner wall of the housing is provided with a first internal screw thread, an outer wall of the inner container is provided with a second external screw thread fitting with the first internal screw thread or at least two bumps spaced from each other, the second external screw thread fits with the first internal screw thread or the bumps fit with a thread groove of the first internal screw thread so that the inner container is connectable to the housing, and the inner wall of the cup cover is provided with a second internal screw thread fitting with the first external screw thread.

The first external screw thread has a same inclination and rotational direction as the first internal screw thread.

The housing has an accommodation space larger than the volume of the inner container, and when the inner container is arranged within the housing, there is a water storage space between the inner container and the housing.

The brewing and squeezing cup further includes an intelligent module, an inner side of a bottom of the housing and/or an outer side of a bottom of the inner container are provided with a placing groove, the intelligent module is adapted to be placed in the placing groove, the intelligent module includes a microprocessor, and a timer and a warning indicator both electrically connected to the microprocessor, the timer is configured to time and send an instruction to the microprocessor when reaching a preset drinking interval time, the microprocessor is configured to receive the instruction from the timer and control the warning indicator to generate light or sound to warn a user to drink.

The intelligent module further includes a gravity sensing circuit, a low voltage power supply circuit and a temperature sensing circuit electrically connected to the microprocessor respectively, the gravity sensing circuit is configured to sense an operating state of the brewing and squeezing cup, the temperature sensing circuit is configured to sense a temperature of fluid in the brewing and squeezing cup, the microprocessor has a data storage module and a Bluetooth or Wi-Fi communication circuit configured to make data exchange with a mobile communication device.

Advantages or principles of the above technical solutions are described as below.

For the above brewing and squeezing cup, when it is used to squeeze for fruit juice, the cup cover is connected to the cup body, the tip of the cone arranged to face upwards with respect to the cup body, and one half piece of fruit such as orange, lemon, kiwi and passion fruit is aligned with the tip of the cone at its flesh's central position. Then the half piece of fruit is pushed downwards and rotated through hands, the fruit juice and flesh can be squeezed out through the scraping strips or protrusions, the fruit juice in liquid form flows into the cup body through the first filter holes and the second filter holes, and the flesh in solid form is left on the filter plate. When the above brewing and squeezing cup is used to brew tea, the cone is arranged in a reverse direction so that its tip faces downwards with respect to the cup body. Tea leaves are fed into the accommodating chamber of the cone through the opening, boiled water is poured into the cup body, and the boiled water flows into the accommodating chamber through the second filter holes to brew tea. After the tea is made, the cup cover is taken down to separate the tea leaves from the tea water, to control the concentration of the tea. When it is required to rinse the tea leaves, a little of boiled water is poured into the cup body, the opening of the cone is covered by the cup cover closely, the brewing and squeezing cup is reversed, the bottom of the cup body is held to move from left to right and from right to left repeatedly, and the little of boiled water is drained. In addition, in order to facilitate the control of the concentration of the tea, the water level of the boiled water poured into the cup body can be controlled to be close the position of the tip of the cone. In this case, after covering the bottom cover, turn the brewing and squeezing cup upside down, and after the tea leaves have been appropriately steeped, turn the brewing and squeezing cup back, to separate the tea leave from the water. In this way, the concentration of the tea can be easily controlled. The brewing and squeezing cup can not only squeeze fruit juice but can also brew tea by providing the brewing and squeezing device, can also control the concentration of the tea, has a simple structure, and is convenient to clean and carry.

DESCRIPTION OF REFERENCE SIGNS

10 brewing and squeezing device; 110 cone; 112 opening; 114 scrape strip; 116 second filter hole; 118 limiting groove; 120 cup cover; 122 slot; 1222 guide groove; 1224 inserting groove; 124 flange; 126 fastening portion; 128 second internal screw thread; 130 filter plate; 132 first filter hole; 134 first boss; 20 bottom cover; 210 second boss; 220 fastening seat; 230 limit stop; 30 cup body; 310 inner container; 312 bump; 320 housing; 322 first external screw thread; 324 first internal screw thread; 40 seal ring; 410 first groove; 420 hole; 430 rib; 440 second groove; 50 intelligent module; 510 microprocessor; 520 timer; 530 gravity sensing circuit; 540 temperature sensing circuit; 550 low voltage power supply circuit; 560 data storage module; 570 Bluetooth or Wi-Fi communication circuit; and 580 warning indicator.

DETAILED DESCRIPTION OF PREFERRED EMBODIMENTS

Figure 1:
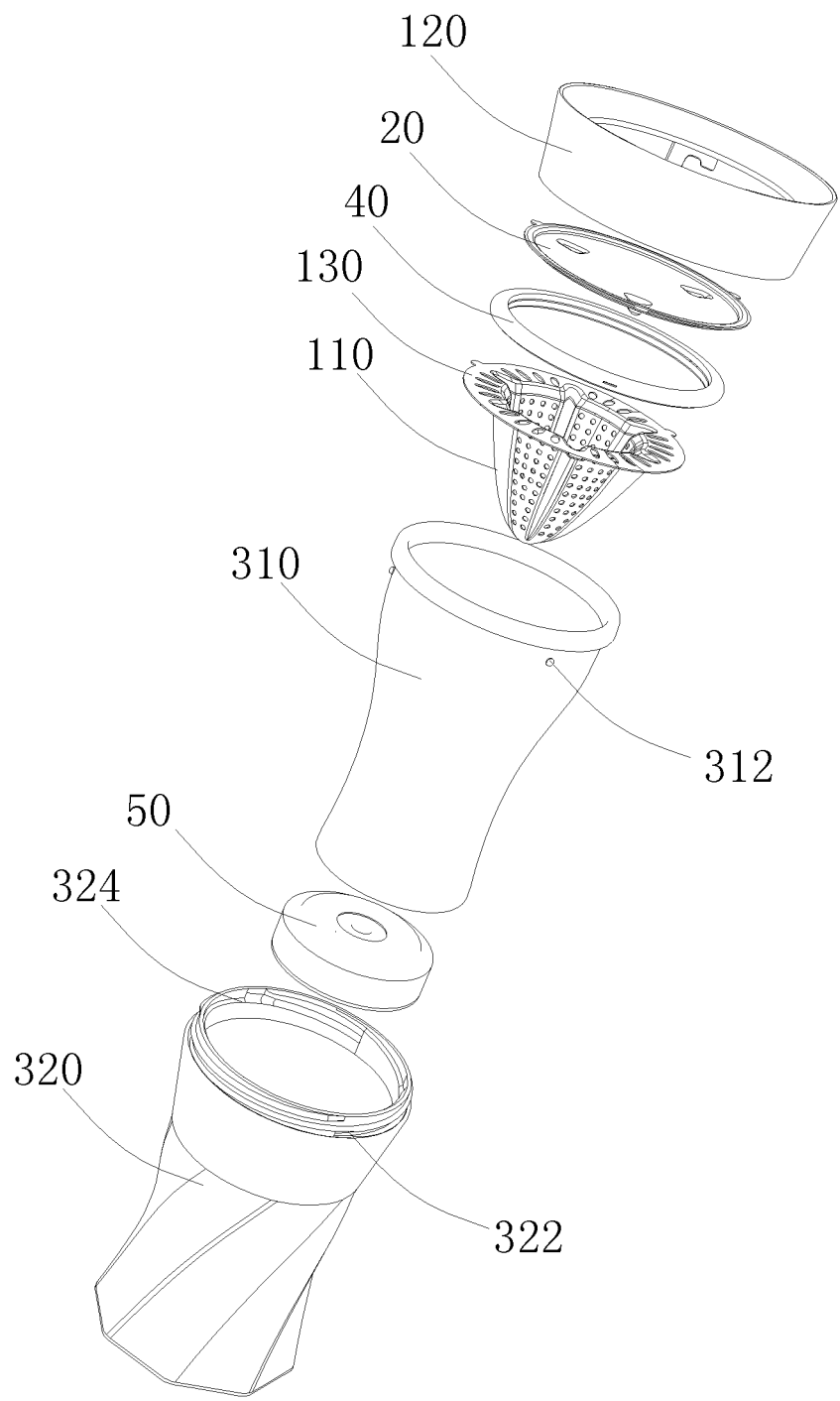
FIG. 1 is an exploded diagram illustrating a brewing and squeezing cup according to an embodiment of the present disclosure.

As shown in FIG. 1, a brewing and squeezing cup is provided, including a brewing and squeezing device 10, a bottom cover 20 and a cup body 30. The brewing and squeezing device 10 includes a cone 110 with an accommodating chamber and a cup cover 120 in a penetrating shape, a bottom end of the cone 110 is provided with a filter plate 130 extending towards an outer periphery thereof, the filter plate 130 is provided with a plurality of first filter holes 132, the bottom end of the cone 110 is provided with an opening 112 in communication with the accommodating chamber, an outer wall of the cone 110 is provided with a plurality of scraping strips 114 or a plurality of protrusions, the outer wall of the cone 110 is further provided with a plurality of second filter holes 116 penetrating to the accommodating chamber, the filter plate 130 is connected to the cup cover 120, the cup cover 120 is connected to the cup body 30 in a detachable manner, the cone 110 is further arranged with a tip facing upwards or downwards with respect to the cup body 30, the bottom cover 20 is adapted to cover the opening of the cone 110, and the bottom cover 20 is connected to the cup cover 120 in a detachable manner.

Figure 2:
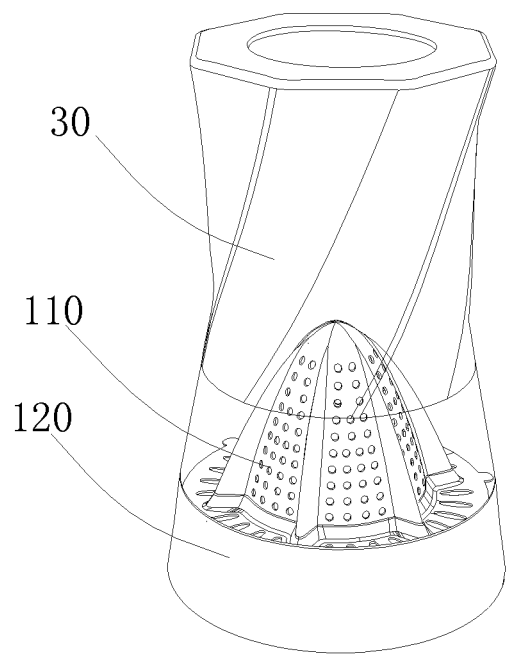
FIG. 2 is a perspective diagram illustrating a brewing and squeezing cup when brewing tea according to an embodiment of the present disclosure.
Figure 3:
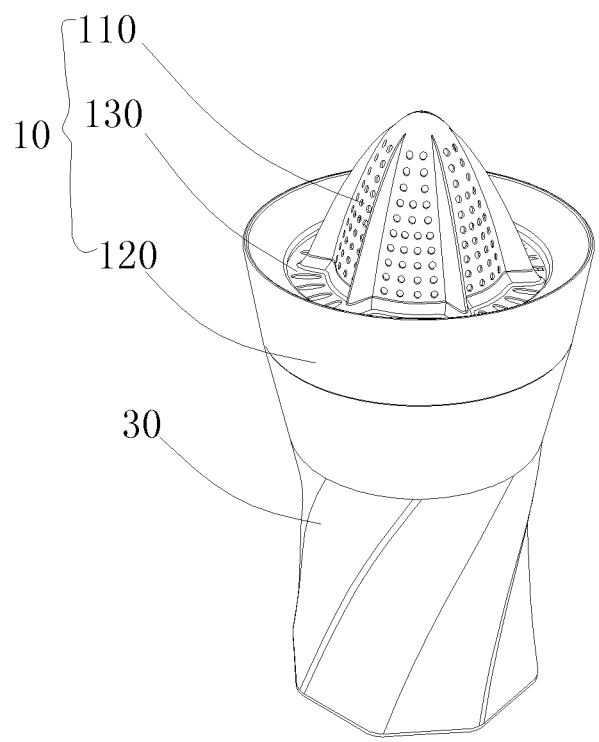
FIG. 3 is a schematic diagram illustrating a brewing and squeezing cup when squeezing fruit juice according to an embodiment of the present disclosure.
Figure 9:
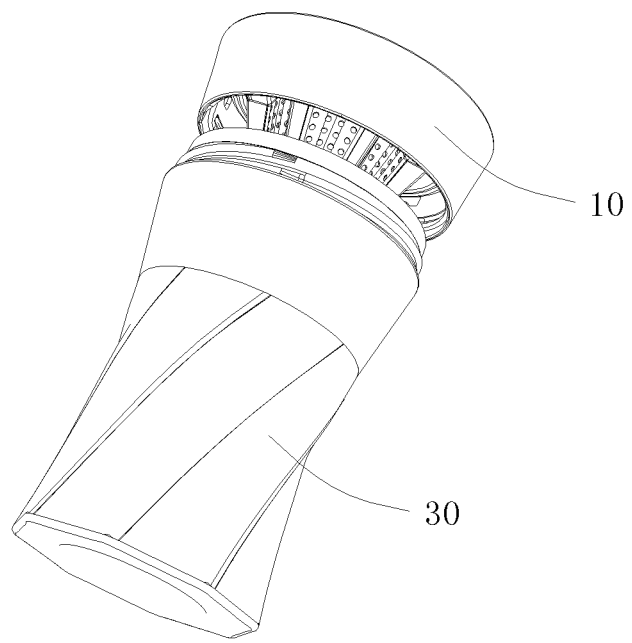
FIG. 9 is a first schematic diagram illustrating an assembly of a brewing and squeezing cup according to an embodiment of the present disclosure.
Figure 10:
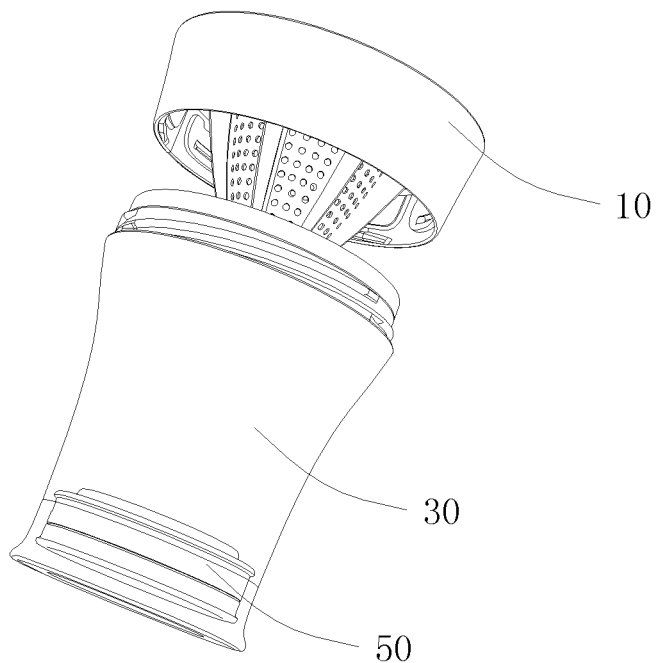
FIG. 10 is a second schematic diagram illustrating the assembly of the brewing and squeezing cup according to an embodiment of the present disclosure.

As shown in FIG. 3, when the above brewing and squeezing cup is used to squeeze fruit juice, the cup cover 120 is connected to the cup body 30, the tip of the cone 110 arranged to face upwards with respect to the cup body 30, and one half piece of fruit such as orange, lemon, kiwi and passion fruit is aligned with the tip of the cone 110 at its flesh's central position. Then the half piece of fruit is pushed downwards and rotated through hands, the fruit juice and flesh can be squeezed out through the scraping strips 114 or protrusions, the fruit juice in liquid form flows into the cup body 30 through the first filter holes 132 and the second filter holes 116, and the flesh in solid form is left on the filter plate 130. As shown in FIGS. 3 and 9-10, when the above brewing and squeezing cup is used to brew tea, the cone 110 is arranged in a reverse direction so that its tip faces downwards with respect to the cup body 30. Tea leaves are fed into the accommodating chamber of the cone 110 through the opening 112, boiled water is poured into the cup body 30, and the boiled water flows into the accommodating chamber through the second filter holes to brew tea. After the tea is made, the cup cover 120 is taken down to separate the tea leaves from the tea water, to control the concentration of the tea. As shown in FIG. 2, when it is required to rinse the tea leaves, a little of boiled water is poured into the cup body 30, the opening 112 of the cone 110 is covered by the cup cover 20 closely, the brewing and squeezing cup is reversed, the bottom of the cup body 30 is held to move from left to right and from right to left repeatedly, and the little of boiled water is drained. In addition, in order to facilitate the control of the concentration of the tea, the water level of the boiled water poured into the cup body can be controlled to be close the position of the tip of the cone 110. In this case, after covering the bottom cover 20, turn the brewing and squeezing cup upside down, and after the tea leaves have been appropriately steeped, turn the brewing and squeezing cup back, to separate the tea leave from the water. In this way, the concentration of the tea can be easily controlled. The brewing and squeezing cup can not only squeeze fruit juice but can also brew tea by providing the brewing and squeezing device 10, can also control the concentration of the tea, has a simple structure, and is convenient to clean and carry.

Figure 4:
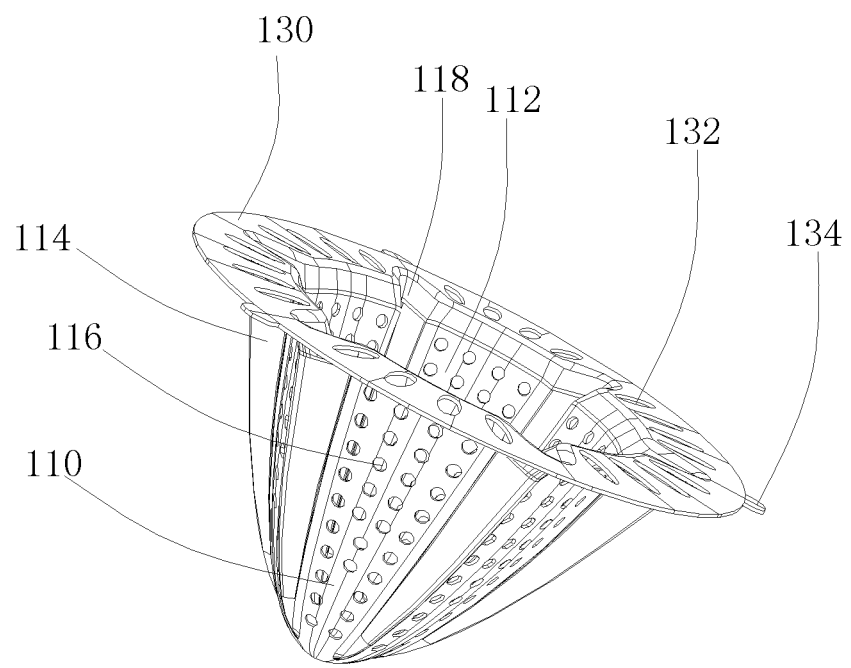
FIG. 4 is a schematic diagram illustrating a cone according to an embodiment of the present disclosure.

As shown in FIGS. 1 to 3, in this embodiment, the filter plate 130 is connected to the cup cover 120 in a detachable manner. When it needs to brew tea, the tip of the cone 110 is arranged to face downwards with respect to the cup body 30, and the bottom cover 20 is connected to the cup cover 120 to cover the opening 112. When it needs to squeeze fruit juice, the tip of the cone 110 is arranged to face upwards with respect to the cup body 30, and the bottom cover 20 is separated from the cup cover 120 to expose the opening 112. As shown in FIG. 4, in this embodiment, the plurality of scraping strips 114 are evenly arranged on the outer wall of the cone 110 around a center line of the cone 110, each scraping strip 114 extending from the tip of the cone 110 to the bottom of the cone 110, with a width and a height gradually increased from the tip of the cone to the bottom of the cone. Such structure is beneficial to scrape flesh and fruit juice. It is preferable to provide cutting edges or sawteeth on each scraping strip 114 to improve the efficiency of squeezing fruit juice, but it is not suitable for thin-peel fruit.

As shown in FIGS. 4-7, an outer periphery of the filter plate 130 is provided with at least two first bosses 134, an outer periphery of the bottom cover 20 is provided with at least two second bosses 210, an inner wall of the cup cover 120 is provided with a slot 122 fitting with the first bosses 134 and the second bosses 210, and the filter plate 130 and the bottom cover 20 are adapted to be engaged with the inner wall of the cup cover 120 through the fitting between the first bosses 134 and the slot 122, and the fitting between the second bosses 210 and the slot 122 respectively. In this embodiment, the connection between the filter plate 130 and the cup cover 120 in a detachable manner may be implemented by the fitting between the first bosses 134 and the slot 122, and the connection between the bottom cover 20 and the cup cover 120 in a detachable manner may be implemented by the fitting between the second bosses 210 and the slot 122. The slot 122 is arranged on the inner wall of the cup cover 120 so that during squeezing fruit juice, the cone 110 can withstand greater extrusion force to prevent the cup cover 120 from being crushed by the extrusion force downwards, to improve the service life of the cup cover 120, and during brewing tea, the tea leaves can be prevented from entering the slot 122, to facilitate cleaning. The detachable connection between the filter plate 130 and the cup cover 120 and between the bottom cover 20 and the cup cover 120 can be implemented in other ways according to practical needs, for example, the cup cover 120 may be provided with a first magnet, each of the filter plate 130 and the bottom cover 20 is provided with a second magnet which is able to be attracted to the first magnet on the cup cover 120, or alternatively, each of the filter plate 130 and the bottom cover 20 may be made of metal material. In these ways, the detachable connection between the filter plate 130 and the cup cover 120 and between the bottom cover 20 and the cup cover 120 can be implemented by magnetic action.

Figure 7:
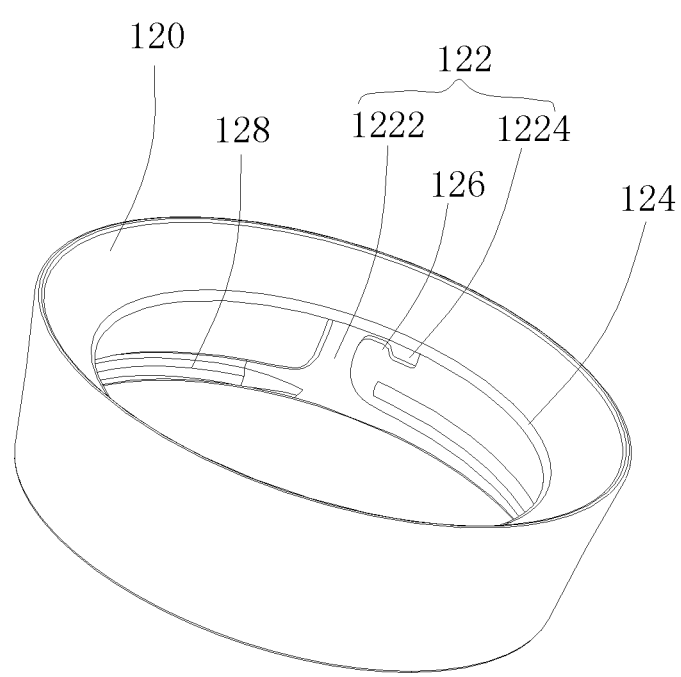
FIG. 7 is a schematic diagram illustrating a cup cover according to an embodiment of the present disclosure.

As shown in FIGS. 3 and 7, the inner wall of the cup cover 120 is provided with a circular flange 124 at a middle part of the inner wall of the cup cover, the slot 122 is arranged at one side of the flange 124, the slot 122 includes a guide groove 1222 arranged along a axial direction of the cup cover 120, and an inserting groove 1224 arranged on the guide groove 1222 side, the inserting groove 1224 is in communication with the guide groove 1222, and a communication channel between the inserting groove 1224 and the guide groove 1222 is provided with a fastening portion 126 adapted to restrict the first bosses 134 and the second bosses 210 from slipping out of the inserting groove 1224. During the installation of the cone 10 or the bottom cover 20, the first bosses 134 and the second bosses 210 may access along the guide groove 1222, the cone 10 or the bottom cover 20 may be turned in a direction towards the inserting groove 1224 to be inserted into the inserting groove 1224, the fastening portion 126 may be positioned between the inserting groove 1224 and the guide groove 1222 to connect the cone 10 or the bottom cover 2 to the cup cover 120, to avoid slippage during brewing tea or squeezing fruit juice. Since the inner wall of the cup cover 120 is provided with the circular flange 124, it can not only restrict the cone 10 and the bottom cover 20 to be positioned within one side of the flange 124, but also further improve the sealing effect. The slot 122 may be restricted to be positioned within one side of the flange 124, that is, the filter plate 130 may be restricted to be positioned within one side of the flange 124, so the wall surface of the cup cover 120 on the other side of the flange 124 can prevent the fruit juice from spilling out of the cup body 30 during squeezing fruit juice.

Figure 6:
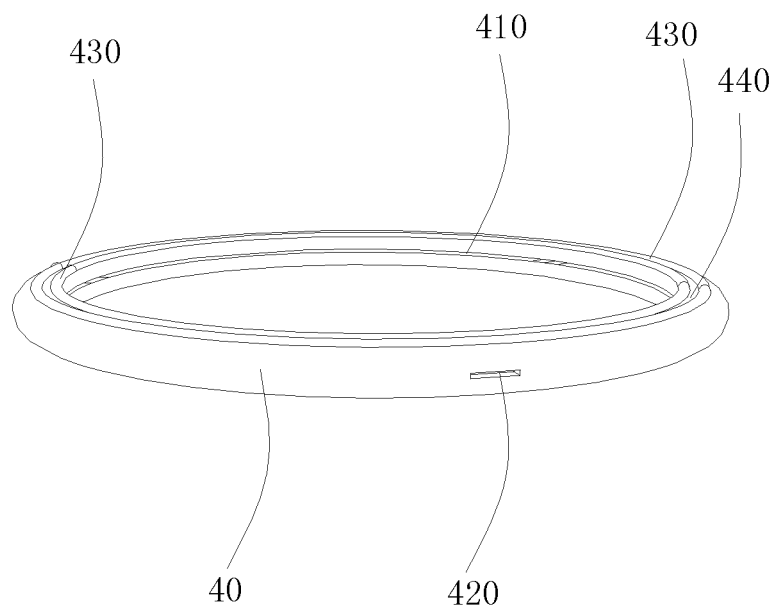
FIG. 6 is a schematic diagram illustrating a seal ring according to an embodiment of the present disclosure.

As shown in FIGS. 1 and 6, in this embodiment, the brewing and squeezing cup further includes a seal ring 40, an inner wall of the seal ring 40 is provided with a first groove 410 fitting with the outer periphery of the filter plate 130, an outer wall of the seal ring 40 is provided with through holes 420 penetrating to the inner wall of the seal ring, the through holes 420 fit with the first bosses 134, the seal ring 40 is adapted to be fit over the outer periphery of the filter plate 130 through the first groove 140, and the first bosses 134 are adapted to extend out of the seal ring 40 through the through holes 420. By arranging the seal ring 40 between the cup cover 120 and filter plate 130, covering the seal ring 40 on the outer periphery of the filter plate 130, and covering the bottom cover 20 on the filter plate 130, the outer circle of the bottom cover 20 can contact with the seal ring 40 closely, to have good sealing effect to avoid leakage during brewing tea.

Figure 5:
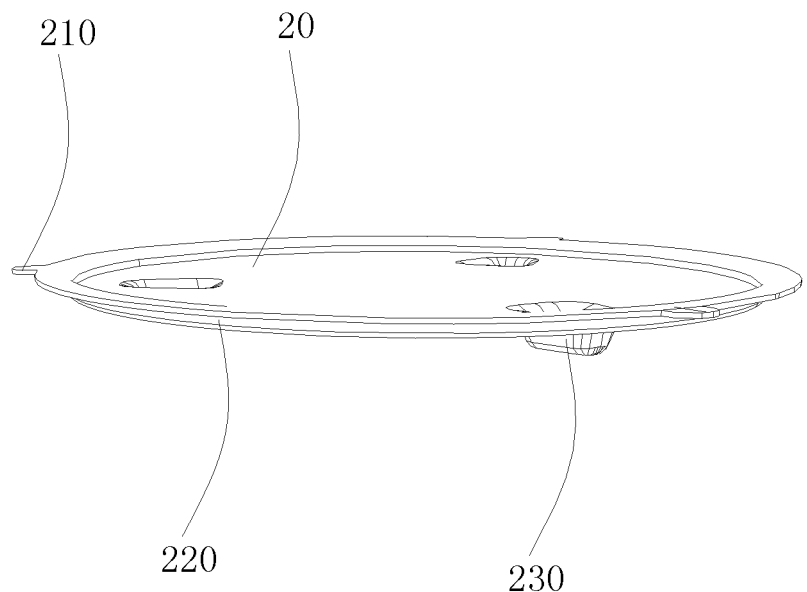
FIG. 5 is a schematic diagram illustrating a bottom cover according to an embodiment of the present disclosure.

As shown in FIGS. 5 and 6, the bottom cover 20 is provided with a projecting fastening seat 220 on a side opposite to the opening 112, so that when the bottom cover 20 covers the opening 112, an inner circle of the seal ring 40 covers on an outer periphery of the fastening seat 220. One end face of the seal ring 40 is provided with two projecting ribs 430, a gap between the two ribs 430 forms a second groove 440. As shown in FIG. 9, when brewing tea, the second groove 440 of the seal ring 40 covers on a rim of the cup body 30. As shown in FIG. 3, when squeezing fruit juice, the seal ring 40 is reversely mounted to make the ribs 430 abut against the flange 124. When brewing tea, the fastening seat 220 of the bottom cover 20 is embedded in the inner circle of the seal ring 40 to strengthen the seal ring 40. The outer circle of the bottom cover 20 can be closely connected with the outer circle of the filter plate 130 through the seal ring 40. When the cup cover 120 is connected to the cup body 30, the second groove 440 of the seal ring 40 is stuck on the rim of the cup body 30, and meanwhile, the seal ring 40 is under vertical extrusion, so that the cup body 30 and the bottom cover 20 form a fully sealed container, to further improve the sealing of the brewing and squeezing cup. When squeezing fruit juice, since the bottom cover 20 is not required to be mounted, the seal ring 40 is reversely mounted, one end face of the seal ring 40 with ribs 430 may contact with the flange 124 of the cup cover 120, the height of each rib 430 may compensate the height loss caused by the removing of the bottom cover 20, to fasten the cone 110 in the slot 122 of the cup cover 120 so that the cone 110 is not easy to stride over the fastening portion 126 of the cup cover 120 to fall off. In addition, the other end face of the seal ring 40 without rib 430 may contact with the rim of cup body 30, and after the cup cover 120 is closely connected with the cup body 30, the whole brewing and squeezing device 10 and the cup body 30 may form a substantially sealed container to only leave the first filter holes 132 and the second filter holes 116 to filter fruit juice.

As shown in FIGS. 1, 4 and 5, a surface of the fastening seat 220 is provided with at least two limit stops 230, the opening 112 of the cone 110 is provided with at least two limit grooves 118 fitting with the limit stops 230, and the limit stop 230 is adapted to be inserted into the limiting groove 118 when the bottom cover 20 covers the opening 112. The position of the bottom cover 20 can be limited by the fitting between the limit stops 230 and the limit grooves 118, to avoid the impact on the sealing by the rotary movement of the bottom cover 20, and facilitate to make the bottom cover 20 and the cone 110 to be assembled in place. The bottom cover 20 may be made of stainless steel, which may be used to cut the fruit to be squeezed, with convenient and efficient. In other embodiment, the bottom cover 20 may be made of Tibetan silver instead of stainless steel, to achieve functions of sterilization, water purification and poison identification. When the brewing and squeezing cup is used to brew tea, the tea leaves may be stacked in the accommodating chamber of the cone 110, the bottom cover 20 may cover the filter plate 130, the bottom cover may cover the opening of the cone 110, the first bosses 134 and the second bosses 210 may be overlapped by the fitting between the limit stops 230 and the limiting grooves 118 when the bottom cover 20 is connected to the filter plate 130, and the filter plate 130 and the bottom cover are stuck on the cup cover 120. In this way, the positioning of components is accurate, and the installation is more convenient.

Figure 8:
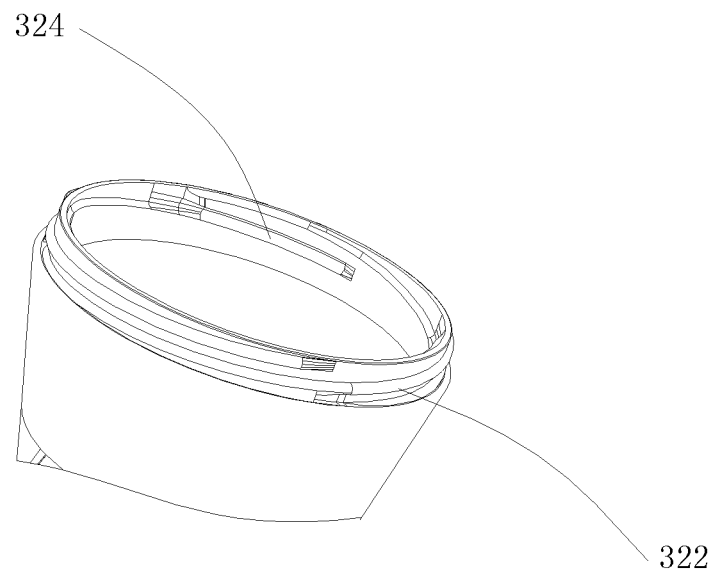
FIG. 8 is an enlarged view showing a housing according to an embodiment of the present disclosure.
Figure 11:
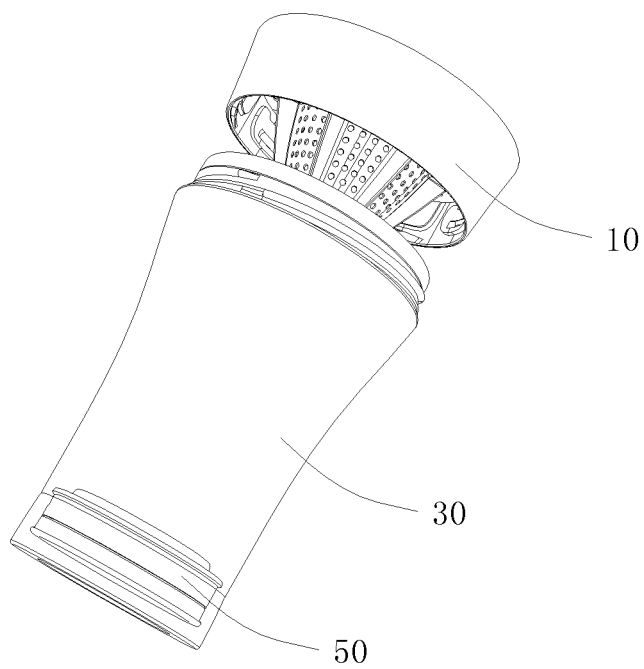
FIG. 11 is a third schematic diagram illustrating the assembly of the brewing and squeezing cup according to an embodiment of the present disclosure.

As shown in FIGS. 1, 8 and 11, in this embodiment, the cup body 30 includes an inner container 310 and a housing 320 covering the inner container, an outer wall of an opening of the housing 320 is provided with a first external screw thread 322, an inner wall of the housing 320 is provided with a first internal screw thread 324, and an outer wall of the inner container 310 is provided with at least two bumps 312 spaced from each other and fitting with the first internal screw thread 324. The bumps fit with a thread groove of the first internal screw thread 324 so that the inner container 310 is connectable to the housing 320. Alternatively the outer wall of the inner container 310 is provided with a second external screw thread fitting with the first internal screw thread 324, and the second external screw thread fits with the first internal screw thread 324 so that the inner container 310 is connectable to the housing 320. The inner wall of the cup cover 120 is provided with a second internal screw thread 128 fitting with the first external screw thread 322. The inner container 310 may be engaged with or disengaged from the housing 320 through thread, and the cup cover 120 may be also engaged with or disengaged from the housing thread, to implement assembly and disassembly. The threaded connection can be instead by other connection modes, for example, snap-fit. As shown in FIG. 8, in this embodiment, each of the inner wall and outer wall of the housing 320 is provided with a thread structure, and the first external screw thread 322 has a same inclination and rotational direction as the first internal screw thread 324, so it is adopted to implement rotary mould during production, and there is no joint line in the product, to improve the aesthetic of the product.

As shown in FIGS. 9-11, in the case that the opening size and height of the inner container 310 are fixed, the style and pattern of the inner container 310 may be replaced randomly. The housing may be modified to have a wide range of shapes when meeting the screw-thread fit with the cup cover. In this embodiment, the housing 320 has an accommodation space larger than the volume of the inner container 310, and when the inner container 310 is arranged within the housing 320, there is a water storage space between the inner container and the housing. In this way, hot water in the housing may heat the cool water in the inner container 310, or the cool water in the housing may cool the hot water in the inner container 310, through thermal transmission. The inner container 310 may be made of glass, ceramic, stainless steel or other appropriate materials, and the housing 320 may be made of plastic, rubber or other appropriate materials. On one hand, it avoids burning hands while brewing tea, and on the other hand, it prevents harmful elements from being released into the tea water when the housing 310 is soaked in high temperature water for a long time.

According to practical needs, the filter plate 130 is fixedly connected to the cup cover 120, and the filter plate 130 is fixed at the middle part of the inner wall of the cup cover 120, and each of portions of the inner wall of the sup cover 120 at both sides of the filter plate 130 is provided with second internal screw thread 128. In this way, for brewing tea, one side of the cup cover 120 close to the tip of the cone 110 is connected to the cup body 30 to make the tip of the cone 110 face downwards with respect to the cup body 30, and the bottom cover 20 is connected to the cup cover 120 to cover the opening 112, and for squeezing fruit juice, one side of the cup cover 120 away from the tip of the cone 110 is connected to the cup body 30 to make the tip of the cone 110 face upwards with respect to the cup body 30, and the bottom cover 20 is separated from the cup cover 120 to expose the opening 112. A corresponding side of the cup cover 120 is required to be connected to the housing 320 to switch between squeezing fruit juice and brewing tea, without dismounting and mounting the cone 110.

Figure 12:
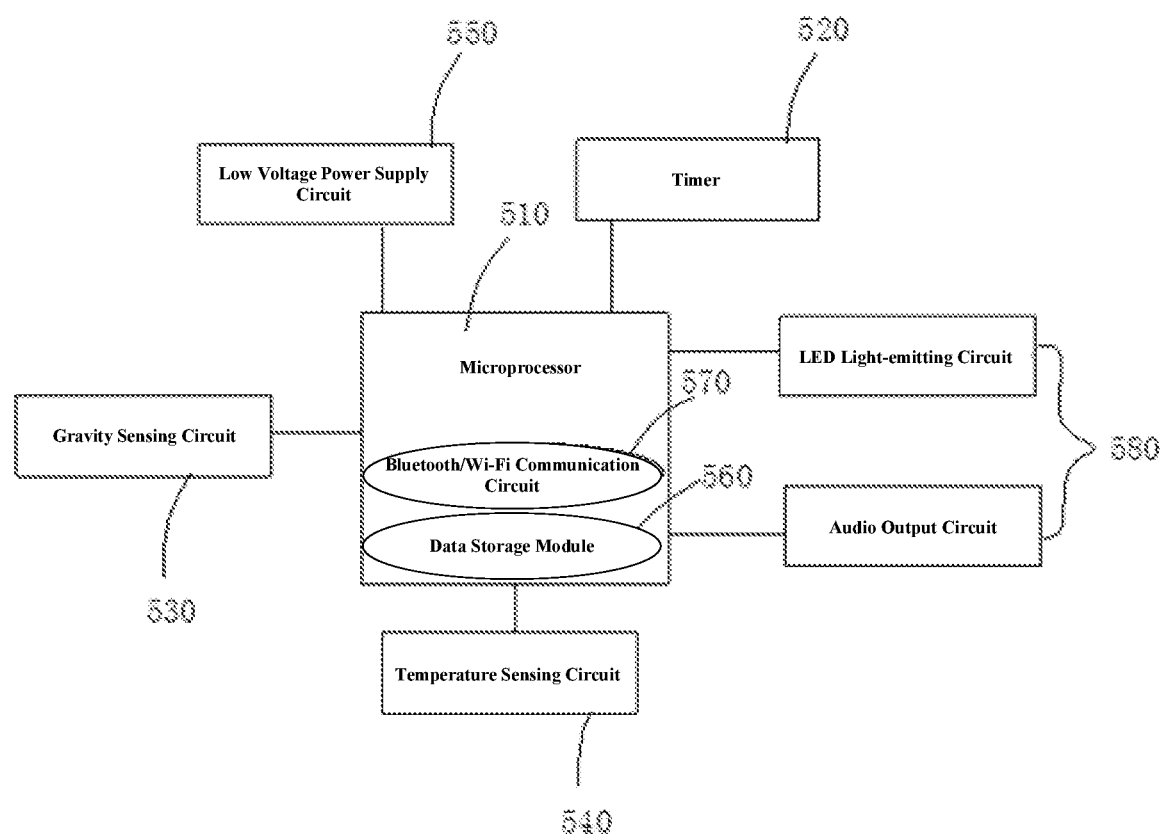
FIG. 12 is a block diagram illustrating an intelligent module according to an embodiment of the present disclosure

As shown in FIG. 12, in this embodiment, the brewing and squeezing cup further includes an intelligent module 50, an inner side of a bottom of the housing 320 and/or an outer side of a bottom of the inner container 310 are provided with a placing groove, and the intelligent module 50 is adapted to be placed in the placing groove. The intelligent module 50 includes a microprocessor 510, and a timer 520 and a warning indicator 580 both electrically connected to the microprocessor 510. The timer 520 is configured to time and send an instruction to the microprocessor 510 when reaching a preset drinking interval time. The microprocessor 510 is configured to receive the instruction from the timer 520 and control the warning indicator 580 to generate light or sound to warn a user to drink. The warning indicator 580 includes a LED light-emitting circuit such as a LED lamp, and/or an audio output circuit such as a loudspeaker, for generating light of different colors or generating different sounds, playing a role in prompting or warning. The intelligent module 50 is placed in the placing groove, which is easy for disassembly and assembly. The light from the LED may produce a perfect light diffraction effect.

In this embodiment, the intelligent module 50 further includes a gravity sensing circuit 530, a low voltage power supply circuit 550 and a temperature sensing circuit 540 electrically connected to the microprocessor 510 respectively. The gravity sensing circuit 630 is configured to sense an operating state of the brewing and squeezing cup, the temperature sensing circuit 540 is configured to sense a temperature of fluid in the brewing and squeezing cup, the microprocessor 510 has a data storage module 560 and a Bluetooth or Wi-Fi communication circuit 570 configured to make data exchange with a mobile communication device. The data storage module 560 can record time amounts of brewing for different kinds of tea leaves. When brewing tea, the microprocessor 510 may receive an instruction of brewing tea corresponding to the user. The microprocessor 510 may send a control instruction to the timer 520, based on the time amounts of brewing for different kinds of tea leaves recorded in the data storage module 560. The timer 520 may send an instruction to the microprocessor 510 after the scheduled time. The microprocessor 510 may control the warning indicator 580 to warn the user to reverse the brewing and squeezing cup by a changed color of light or a changed sound, to separate the tea leaves from the water, for the purpose of effective control of the concentration of the tea. The gravity sensing circuit may sense different states of the brewing and squeezing cup, such as drinking state, squeezing state or shaking state, and send the state information to the microprocessor 510, to make the LED lamp change its color. For example, the frequency of the change in the color of light may be changed with the shaking frequency, to stimulate the interest of drinking. The intelligent module 50 may make bidirectional data exchange with a mobile communication device such as mobile phone, through the Bluetooth or Wi-Fi communication circuit 570. The mobile phone may transmit data from the brewing and squeezing cup to a giant server for data analysis, to achieve the Internet of the brewing and squeezing cup. Meanwhile, the mobile phone may also transmit data at the application client to the intelligent module 50 to store, so the intelligent module 50 can operate independently in non-networked state, to achieve light-emitting or sound warming for a fixed time.

Each technical feature in the above embodiments can be combined in any way, and for the purpose of concise description, not all possible combinations of each technical feature in the above embodiments have been described, however, these combinations of each technical feature all belong to the scope of the present description as long as no contradiction existing.

The above embodiments have only shown some modes of extrusion of the present disclosure, which is described more specifically and in detail, but it cannot be considered as limit to the scope of the present disclosure. It should be noted that, for those skilled in the art, this embodiments may have various variants and modifications without departing from the present inventive concept, all belong to the protection scope of the present disclosure. Thus, the protection scope of the present disclosure subjects to the attached claims

The invention claimed is:

1. A brewing and squeezing cup, comprising a brewing and squeezing device, a bottom cover and a cup body, wherein the brewing and squeezing device includes a cone with an accommodating chamber and a cup cover, a bottom end of the cone is provided with a filter plate extending towards an outer periphery thereof, the filter plate is provided with a plurality of first filter holes, the bottom end of the cone is provided with an opening in communication with the accommodating chamber, an outer wall of the cone is provided with a plurality of scraping strips or a plurality of protrusions, the outer wall of the cone is further provided with a plurality of second filter holes penetrating to the accommodating chamber, the filter plate is connected to the cup cover, the cup cover is connected to the cup body in a detachable manner, the cone is further arranged with a tip facing upwards or downwards with respect to the cup body, the bottom cover is adapted to cover the opening of the cone, and the bottom cover is connected to the cup cover in a detachable manner;

wherein the filter plate is connected to the cup cover in a detachable manner; when the brewing and squeezing cup is used to brew tea, the tip of the cone is arranged to face downwards with respect to the cup body, and the bottom cover is connected to the cup cover to cover the opening; and when the brewing and squeezing cup is used to squeeze fruit juice, the tip of the cone is arranged to face upwards with respect to the cup body, and the bottom cover is separated from the cup cover to expose the opening; and wherein an outer periphery of the filter plate is provided with at least two first bosses, an outer periphery of the bottom cover is provided with at least two second bosses, an inner wall of the cup cover is provided with a slot, fitting with the at least two first bosses and the at least two second bosses, and the filter plate and the bottom cover are adapted to be engaged with the inner wall of the cup cover through the fitting between the at least two first bosses and the slot, and the fitting between the at least two second bosses and the slot respectively.

2. The brewing and squeezing cup according to claim 1, further comprising a seal ring, an inner wall of the seal ring is provided with a first groove fitting with the outer periphery of the filter plate, an outer wall of the seal ring is provided with through holes penetrating to the inner wall of the seal ring, the through holes fit with the at least two first bosses, the seal ring is adapted to be fit over the outer periphery of the filter plate through the first groove, and the at least two first bosses are adapted to extend out of the seal ring through the through holes.

3. The brewing and squeezing cup according to claim 2, wherein the inner wall of the cup cover is provided with a circular flange at a middle part of the inner wall of the cup cover, the slot is arranged at one side of the flange, the slot includes a guide groove arranged along an axial direction of the cup cover, and an inserting groove arranged on a guide groove side, the inserting groove is in communication with the guide groove, and a communication channel between the inserting groove and the guide groove is provided with a fastening portion adapted to restrict the at least two first bosses and the at least two second bosses from slipping out of the inserting groove.

4. The brewing and squeezing cup according to claim 3, wherein the bottom cover is provided with a projecting fastening seat on a side opposite to the opening, so that when the bottom cover covers the opening, an inner circle of the seal ring covers on an outer periphery of the fastening seat; one end face of the seal ring is provided with two projecting ribs, a gap between the two projecting ribs forms a second groove; and when brewing tea, the second groove of the seal ring fits on a rim of the cup body, and when squeezing for fruit juice, the seal ring is reversely mounted to make the two projecting ribs abut against the flange.

5. The brewing and squeezing cup according to claim 4, wherein a surface of the fastening seat is provided with at least two limit stops, the opening of the cone is provided with at least two limit grooves fitting with the at least two limit stops, and each of the at least two limit stops is adapted to be inserted into a corresponding one of the at least two limiting grooves when the bottom cover covers the opening.

6. The brewing and squeezing cup according to claim 1, wherein the plurality of scraping strips are evenly arranged on the outer wall of the cone around a center line of the cone, each scraping strip extending from the tip of the cone to the bottom of the cone, with a width and a height gradually increased from the tip of the cone to the bottom of the cone.

7. The brewing and squeezing cup according to claim 1, wherein the filter plate is fixedly connected to the cup cover, the filter plate is at a middle part of an inner wall of the cup cover, and each of portions of the inner wall of the cup cover at both sides of the filter plate is capable of being connected to an outer wall of a rim of the cup body by screw threads, wherein the cup cover has a first side and a second side opposite to each other, when brewing tea, the first side of the cup cover closer to the tip of the cone with respect to the second side of the cup cover is connected to the cup body to make the tip of the cone face downwards with respect to the cup body, and the bottom cover is connected to the cup cover to cover the opening, and for squeezing fruit juice, the second side of the cup cover away from the tip of the cone with respect to the first side of the cup cover is connected to the cup body to make the tip of the cone face upwards with respect to the cup body, and the bottom cover is separated from the cup cover to expose the opening.

8. The brewing and squeezing cup according to claim 1, wherein the cup body includes an inner container and a housing covering the inner container, an outer wall of an opening of the housing is provided with a first external screw thread, an inner wall of the housing is provided with a first internal screw thread, an outer wall of the inner container is provided with a second external screw thread fitting with the first internal screw thread or at least two bumps spaced from each other, the second external screw thread fits with the first internal screw thread or the at least two bumps fit with a thread groove of the first internal screw thread so that the inner container is connectable to the housing, and the inner wall of the cup cover is provided with a second internal screw thread fitting with the first external screw thread.

9. The brewing and squeezing cup according to claim 8, wherein the first external screw thread has a same inclination and rotational direction as the first internal screw thread.

10. The brewing and squeezing cup according to claim 9, wherein the housing has an accommodation space larger than the volume of the inner container, and when the inner container is arranged within the housing, there is a water storage space between the inner container and the housing.

11. The brewing and squeezing cup according to claim 8, further comprising an intelligent module, wherein an inner side of a bottom of the housing and/or an outer side of a bottom of the inner container are provided with a placing groove, the intelligent module is adapted to be placed in the placing groove, the intelligent module includes a microprocessor, and a timer and a warning indicator both electrically connected to the microprocessor, the timer is configured to time and send an instruction to the microprocessor when reaching a preset drinking interval time, the microprocessor is configured to receive the instruction from the timer and control the warning indicator to generate light or sound to remind a user to drink.

12. The brewing and squeezing cup according to claim 11, wherein the intelligent module further includes a gravity sensing circuit, a low voltage power supply circuit and a temperature sensing circuit electrically connected to the microprocessor respectively, the gravity sensing circuit is configured to sense an operating state of the brewing and squeezing cup, the temperature sensing circuit is configured to sense a temperature of fluid in the brewing and squeezing cup, the microprocessor has a data storage module and a Bluetooth or Wi-Fi communication circuit configured to make data exchange with a mobile communication device.

\* \* \* \* \*